Figure 1:
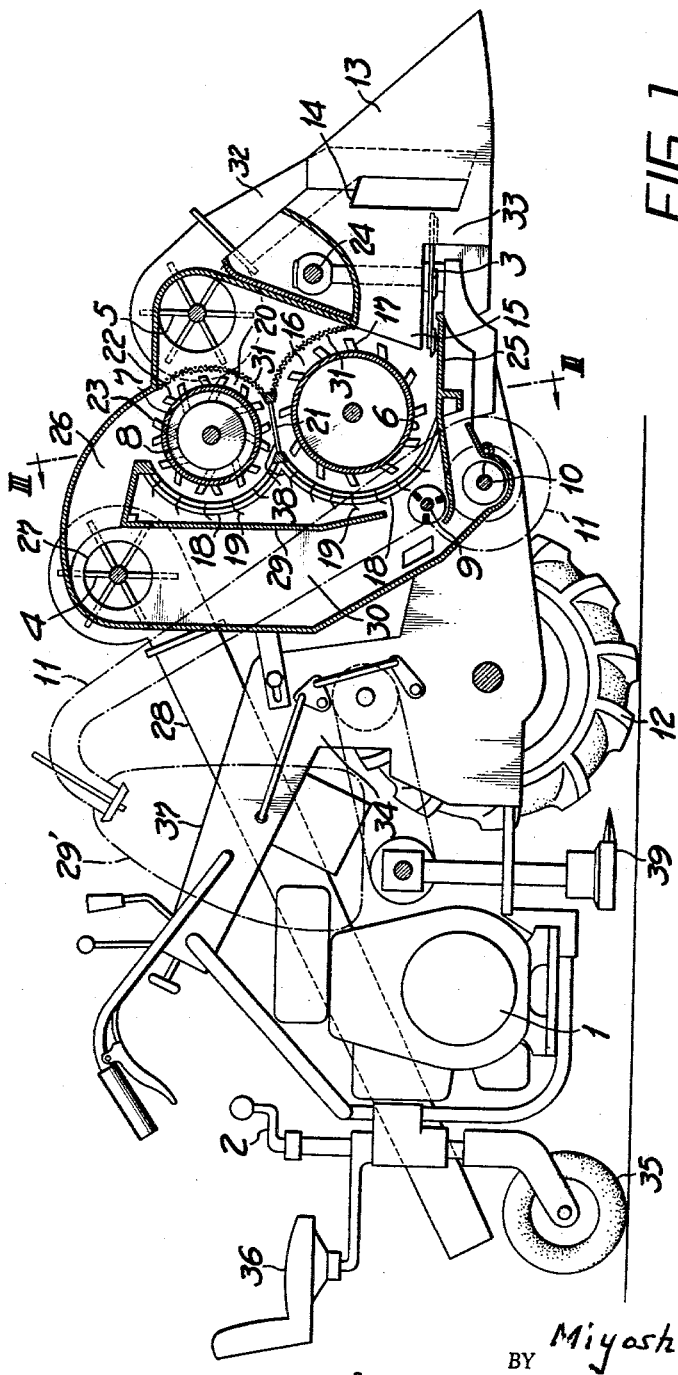

Feb. 16, 1965  MIYOSHI SUZUE  3,169,357
PNEUMATIC HARVESTER AND THRESHER
Filed Nov. 29, 1963  3 Sheets-Sheet 1

INVENTOR.
Miyoshi Suzue
BY
Stevens, Davis, Miller & Mosher
Attorneys

United States Patent Office 3,169,357
Patented Feb. 16, 1965

3,169,357
PNEUMATIC HARVESTER AND THRESHER
Miyoshi Suzue, 1343-1 Higashisaki, Nangoku-shi,
Kochi-ken, Japan
Filed Nov. 29, 1963, Ser. No. 326,983
Claims priority, application Japan, Dec. 4, 1962,
37/54,635
1 Claim. (Cl. 56—21)

The present invention relates to a harvesting machinery provided with a pair of grass boards, right and left, at the front end of a power vehicle, and with a device for harvesting at the base portion of both grass-boards, and with a threshing cylinder at the back upper portion and a grain separating chamber at its back portion, characterized in that a wire net preventing grains from passing is expanded at the upper front portion of the threshing chamber, a passage of air current communicating from said wire net with the blast port opened upward of the reaping blade from the internal walls of the grass boards, right and left, is provided, in said passage is provided a circulating blower producing a strong air current going toward the blast port from the wire net, at the back side of the threshing chamber is expanded a concave allowing the grains and straw dust escape from the threshing chamber into the grain separating chamber, an exhaust blower is provided carrying the straw dust and exhaust straw out of the machine, an exhaust port for straw thresher in the threshing chamber is provided at the upper portion at the end of the threshing chamber, and this exhaust port faces the absorbing port of the aforesaid exhaust blast port to reap, to thresh, to separate grains, such as rice or wheat.

The present invention is a harvesting machinery utilizing fully the air current, which guides the ear stalks into the reaping portion by the blast air current to reap it and the reaped ear stalks are absorbed and carried to the threshing chamber by the absorbing air current, which is, in the threshing chamber, divided into air currents in three directions. The first air current is a circulating air current blasted from inside the separating board toward the upper side of the reaping blade through the circulating blower and is absorbed into the threshing chamber from the feed entrance of the threshing chamber. The second air current is a grain separating air current coming through the grain separating chamber to the exhaust blower from the concave at the back side of the threshing chamber, and the third air current is an air current for carrying ear stalks that moves, while rotating with the threshing cylinder and the straw, along the threshing cylinder of the threshing chamber and goes from the exhaust port at the end of the threshing chamber to the exhaust blower together with the ear stalks. And the grain separating air current and the carrying air current are exhausted backward of the machinery together with exhaust straw, straw dust and dust by an exhaust blower.

Figure 2:
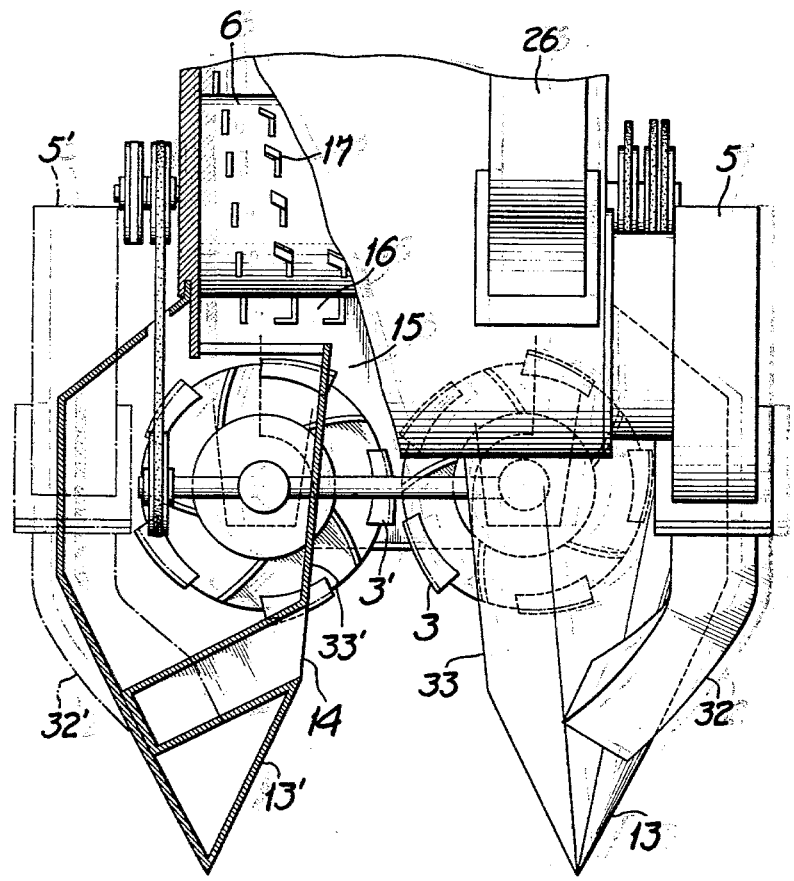
Figure 3:
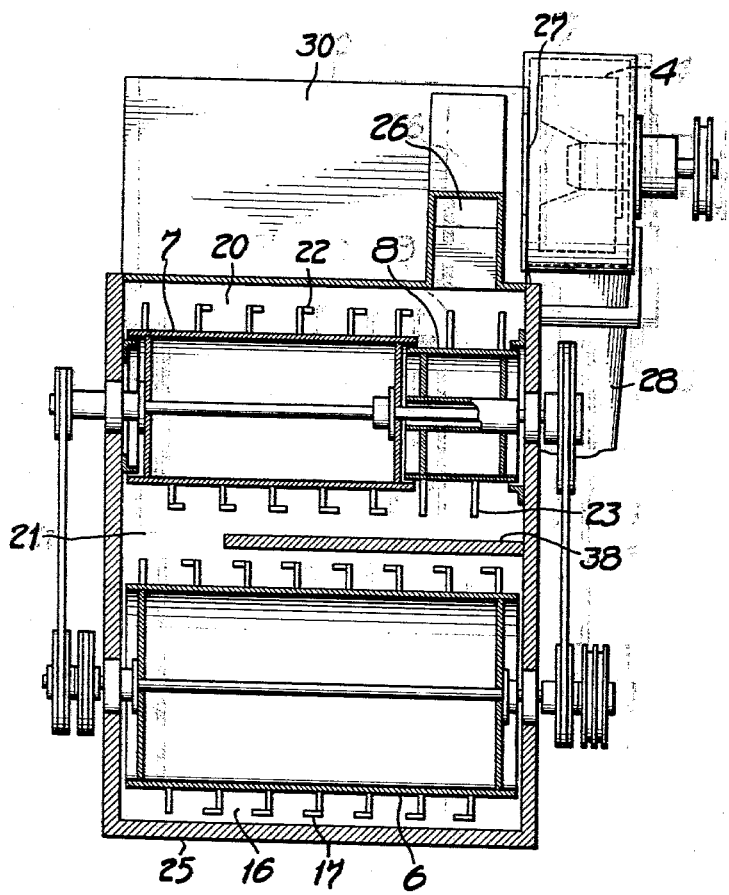

The drawings exemplifies an embodiment of the present invention, FIG. 1 being a side elevation of the essential portion cut longitudinally, FIG. 2 a plan view of the essential portion partially cut, and FIG. 3 a front view cut along line III—III.

To explain in detail in reference to the drawings, annexed, by first starting the engine 1 the height of the reaping blades 3, 3' are adjusted by a device 2 for adjusting the height of reaping, and when the blowers 4, 5, 5', the threshing cylinders 6, 7, 8, the reaping blades 3, 3', the rotor 9 for adjusting stream, the screw conveyor 10, the grain elevator 11 are driven and the forwarding clutch is switched on, the forwarding wheel 12 (FIG. 1) of the machinery rotates, and the machinery advances toward the grain stalks. The grain stalks guided inside both grass boards 13, 13' by a pair of grass boards, right and left, at the end of the machinery is pressed against the reaping blades 3, 3' by the absorbing air current absorbed from the feed entrance 15 of the threshing chamber 16 and cut at the lower portion of ears, by means of the air current sent from the blast ports for circulating air current 14, 14' opened upwardly of the reaping blades 3, 3' from the internal walls 33, 33' of the grass boards 13, 13'. The ear stalks are sent further by blast and absorption currents to the central portion of the primary threshing chamber 16 from the feed entrance 15, and while being threshed by the rotation of the primary threshing chamber 6 planted with numerous threshing teeth 17 fitted with a feed device and by the action of the piece 19 of the concave 18, it moves in the direction toward the passage 21 of the secondary threshing chamber 20 and enters through said passage 21 into the secondary threshing chamber 20, and while being threshed further by the action of the secondary threshing chamber 7, the threshing teeth of the same 22, the piece 19 of the concave 18 enters the threshing cylinder or the exhaust cylinder 8, and the straw stalks finished of threshing are exhausted backward of the machinery from the exhaust pipe 28, after passing the exhaust port 26, after passing from the exhaust port 26 through the absorbing port 27 of the exhaust blower 4 by the force based on the rotation of the teeth 23 of the exhaust cylinder 8 and the force of absorbing wind of the exhaust blower 4. The grains threshed in the secondary threshing chamber 20 fall along the primary guiding plate 29, being released from the concave 18, and enters downward of the grain separating chamber 30 from the rotor 9 for adjusting stream. As the air current caused by the absorption of the exhaust blower 4 is blowing upwardly from below in the grain separating chamber 30, the grains heavier than this air current drop downward, while lighter straw dust, the dust and the like are absorbed upwardly and separated and the grains are sent sideways of the machinery by the screw conveyer 10 at the lower end of the separating chamber 30 and reach the grain elevator 11, where they are stored in the storage bag 29. The straw dust and the dust absorbed upwardly are exhausted outside of the machinery from the exhaust pipe through the exhaust blower 4 from the absorbing port 27. And the air current absorbed by the pair of circulating blowers 5, 5', right and left, from the wire net 31 that is expanded at the front upper surface of the threshing chambers 16, 20 and prevents grains from passing passes inside of the blast pipes 32, 32' and is blown out from the blast ports 14, 14' opened at the internal walls 33, 33' of the separating boards 13, 13' and becomes the blast air current, and turns again into the circulating air current going to the primary threshing chamber 16 from the feed entrance 15 of the threshing chamber. To the internal surface of the concave 18 and the wire net 31 are constantly absorbed ear grass, straw dust and the like by the action of the absorbing air current, but as the threshing teeth 17, 22 of the threshing cylinders 6, 7 rotate at high speed and catch a great amount of straw, the concave and the wire net are constantly cleared, no clogging occurring and the passage of air current being kept in good condition. As reaping blades 3, 3', a pair of rotary reaping discs, right and left are fitted in this embodiment, but reaping blades of the reciprocating type may well be employed. Again, 34 is a speed change gear, 35 a tail wheel, 36 a stool, 37 a handle body, 24 a driving means of the reaping means 3, 3', 25 the bottom board of the feed entrance 15, 38 a diaphragm between the primary threshing chamber 16 and the secondary threshing chamber 20, and 39 is a means for reaping the remaining stalks.

The present invention, as described above, does not need, as the conventional harvesting machinery, reels for guiding ear stalks or conveyers for conveying reaped ear stalks and the like in order to carry the ear stalks reaped by being pressed to the reaping blades by the air current further to the threshing chamber by the air current, and while the means for reaping and carrying is extremely simplified and minimized, no grains left unthreshed are found of the exhausted straw stalks because ear stalks are threshed in the threshing chamber while being turned over tens of times, and the grains can all be harvested, thus making a grain separating device (straw rack for harvesting) useless, and as the air current employed in absorbing ear stalks is further utilized in separating grains and exhausting exhaust straw outside of the machinery, and the surplus air current is circulated and used again, thus bringing the utility efficiency of the air current to optimum, and the machinery has such advantages, the chief motive power is small and the whole machinery is of small size and the machinery can be manufactured at a low price.

What I claim is:

A harvest machine for harvesting grain stalks having a housing located at the front thereof and comprising a plurality of reaping blades mounted in the front of said housing adapted to cut said stalks, a primary threshing chamber located to the rear of said blades, a secondary threshing chamber communicating with said primary chamber, a plurality of threshing blades disposed in each of said chambers for separating the grain from the stalk, a grain separating chamber adjacent said threshing chambers, and at the rear thereof in which the grains are separated from the dust, straw, and chaff, a pair of blowers located intermediate said threshing blades and said reaping blades, vertically upward and to the side thereof and adapted to suck air from said threshing chambers and discharge said air back into the front of said housing whereby said stalks are blown onto said reaping blades and into said threshing chamber, a plurality of wire nets located intermediate said threshing chambers and said blowers and adapted to prevent the passage of grain from said threshing chamber to said blower, a pair of exhaust blowers located upward from and communicating with said secondary threshing chamber, and adapted to discharge said dust, straw, and chaff from said grain separating chamber to the rear of said machine and also adapted to discharge threshed stalks from said threshing chambers to the rear of said machine, without the passage of grains through said blowers.

References Cited by the Examiner
UNITED STATES PATENTS

| | | | |
|---|---|---|---|
| 1,004,134 | 9/11 | Baldwin | 56—130 |
| 1,146,785 | 7/15 | Colahan. | |
| 1,454,071 | 5/23 | Owens. | |

T. GRAHAM CRAVER, *Primary Examiner.*

ANTONIO F. GUIDA, *Examiner.*